United States Patent [19]

Brown et al.

[11] Patent Number: 5,231,146

[45] Date of Patent: Jul. 27, 1993

[54] POLYPHENYLENE ETHER-POLYETHERAMIDE BLENDS

[75] Inventors: Sterling B. Brown, Schenectady, N.Y.; Richard C. Lowry, Phoenixville, Pa.,

[73] Assignee: General Electric Company, Schenectady, N.Y.

[21] Appl. No.: 825,740

[22] Filed: Jan. 27, 1992

Related U.S. Application Data

[63] Continuation of Ser. No. 584,988, Sep. 20, 1990, abandoned.

[51] Int. Cl.$^5$ .................... C08L 71/12; C08L 77/00
[52] U.S. Cl. ...................... 525/396; 525/92; 525/397; 525/905
[58] Field of Search ............. 525/396, 397, 92, 905

[56] References Cited

U.S. PATENT DOCUMENTS

| | | | |
|---|---|---|---|
| 4,707,528 | 11/1987 | Koizumi et al. | 525/404 |
| 4,806,297 | 2/1990 | Brown et al. | 525/905 |
| 4,839,425 | 6/1989 | Mawatari et al. | 525/397 |
| 4,866,130 | 9/1989 | Brown et al. | 525/905 |
| 4,916,185 | 4/1990 | Yates, III et al. | 525/905 |
| 4,960,836 | 10/1990 | DeRudder | 525/433 |
| 5,084,511 | 1/1992 | Abe et al. | 525/397 |
| 5,089,566 | 2/1992 | Brown et al. | 525/905 |

Primary Examiner—James J. Seidleck
Assistant Examiner—Thomas Hamilton, III
Attorney, Agent, or Firm—William H. Pittman

[57] ABSTRACT

Blended polymer compositions are described which comprise:
(A) at least about 5% by weight of at least one polyphenylene ether;
(B) up to about 95% by weight of at least one block polyetheramide; and
(C) from 0 to about 3% by weight based upon the total weight of components (A), (B) and any other polymers present in the composition of at least one polyepoxide;

with the proviso that when said block polyetheramide has a flex modulus greater than about 75 MPa., said composition contains at least about 0.5% by weight based upon the total weight of components (A), (B) and any other polymers present in the composition of said polyepoxide.

The blends give non-delaminating molded parts with good mechanical properties. The blends can be formed from a high-nitrogen polyphenylene ether and a block polyetheramide without the need for using vacuum-vented polyphenylene ether extrudate and without the need for adding a compatibilizer.

12 Claims, No Drawings

POLYPHENYLENE ETHER-POLYETHERAMIDE BLENDS

This application is a continuation of application Ser. No. 07/584,988, filed Sep. 20, 1990 now abandoned.

FIELD OF THE INVENTION

This invention relates generally to polymer blends which are polymeric compositions comprising a mixture of a polyphenylene ether and a block polyetheramide.

BACKGROUND OF THE INVENTION

The polyphenylene ethers are a widely used class of thermoplastic engineering resins characterized by excellent hydrolytic stability, dimensional stability, toughness, heat resistance and dielectric properties. However, polyphenylene ethers are deficient in that their tensile properties and impact strength are poor. Therefore, there is a continuing search for means for modifying polyphenylene ethers to improve these other properties.

It would be desirable to improve the impact resistance and tensile properties of polyphenylene ethers by blending them with another polymer such as a thermoplastic elastomer (TPE). Potential advantages of blending polyphenylene ethers with a TPE include providing a polyphenylene ether blend with a lower modulus, higher tensile elongation, and higher impact strength than unblended polyphenylene ethers, and a TPE product with improved heat distortion temperature compared to the unblended TPE. However, in general, physical blending of polymers does not provide a complete solution to the problems of the poor impact and tensile properties of polyphenylene ethers because the TPE polymers which would improve the impact resistance of the polyphenylene ethers are generally immiscible with the polyphenylene ethers and frequently undergo phase segregation in molded parts resulting in delamination and/or brittleness. Such parts typically contain large, incompletely dispersed polyphenylene ether particles and no phase interaction between the two resin phases. As a result, interphases between blend component domains are areas of weakness resulting in mechanical failure.

It has been previously proposed to blend polyphenylene ethers with elastomeric polyesters. For example, U.S. Pat. No. 4,831,087 (Brown) describes resin blends prepared from a polyphenylene ether having a low proportion of unneutralized amino nitrogen; an elastomeric polyester or blend thereof with a poly(ethylene terephthalate) or poly(butylene terephthalate); and at least one polymer containing a substantial proportion of aromatic polycarbonate units as a compatibilizing agent. The blends are free from extraneous impact modifiers.

However, these blends require the presence of a compatibilizing agent. Further, prior to blending it is often necessary to remove the thermally labile aminoalkyl-substituted end groups and other amine constituents frequently present as impurities in the polyphenylene ether component. Such expedients as the use of amine quenchers and/or vacuum venting of the polyphenylene ether are effective in decreasing amino nitrogen content, but add a step to the processing operation which may be undesirable under certain circumstances.

There continues to be a need for polyphenylene ether—TPE blends that do not require the presence of a compatibilizer and/or low nitrogen polyphenylene ethers.

SUMMARY OF THE INVENTION

Blended polymer compositions are described which comprise:

(A) at least about 5% by weight of at least one polyphenylene ether;

(B) up to about 95% by weight of at least one block polyetheramide; and (C) from 0 to about 3% by weight based upon the total weight of components (A), (B) and any other polymers present in the composition of at least one polyepoxide;

with the proviso that when said block polyetheramide has a flex modulus greater than about 75 MPa., said composition contains at least about 0.5% by weight based upon the total weight of components (A), (B) and any other polymers present in the composition of said polyepoxide.

The blends give non-delaminating molded parts with good mechanical properties. The blends can be formed from a high-nitrogen polyphenylene ether and a block polyetheramide without the need for using vacuum-vented polyphenylene ether extrudate and without the need for adding a compatibilizer. This result is quite surprising in view of previous blends which required vacuum-venting and/or a suitable compatibilizer.

It is not certain whether any or all of the components in these compositions interact chemically upon blending. Therefore, the invention includes compositions comprising said components and any reaction products thereof, as well as other optional components describe hereinafter.

DETAILED DESCRIPTION

1. Polyphenylene ethers

One of the essential components of the blended polymer compositions of the present invention is at least one polyphenylene ether. In one embodiment, the polyphenylene ether is present in the blended polymer composition in amounts of from about 5% to about 60% by weight, and more often at least about 30% by weight and up to about 40% by weight.

The polyphenylene ethers (also known as polyphenylene oxides) used as component (A) in the present invention comprise a plurality of structural units having the following formula (I):

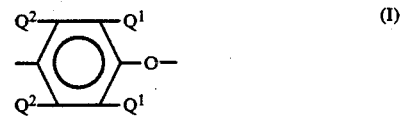

wherein in formula (I), each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinyl aromatic compounds such as styrene, or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000 to about 40,000 and a weight average molecular weight within the range of about 20,000 to about 80,000, as determined by gel permeation chromatography. Its intrinsic viscosity is most often in the range of about 0.15–0.6 and preferably at least 0.25–0.40 dl/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, Ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be used in the invention include those which comprise molecules having at least one of the end groups of the following formulae (II) and (III):

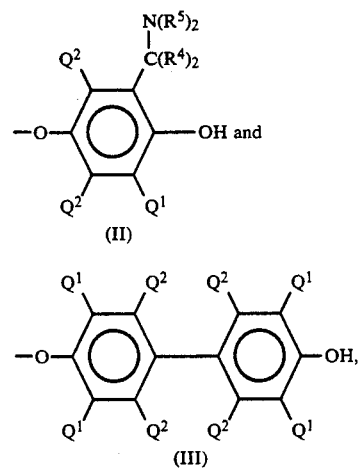

wherein $Q^1$ and $Q^2$ are as previously defined; each $R^4$ is independently hydrogen or alkyl, with the proviso that the total number of carbon atoms in both $R^4$ radicals is 6 or less; and each $R^5$ is independently hydrogen or a $C_{1-16}$ primary alkyl radical. Preferably, each $R^4$ is hydrogen and each $R^5$ is alkyl, especially methyl or n-butyl.

Polymers containing the end groups of formula (II) (herein-after "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the $\alpha$-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide type intermediate of the following formula (IV):

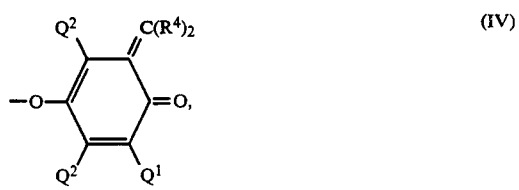

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula (III) are typically obtained from reaction mixtures in which a by-product diphenoquinone of the following formula (V):

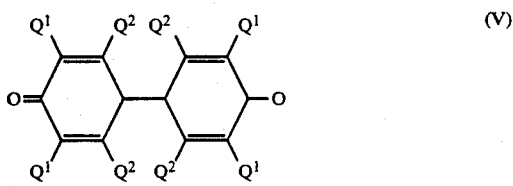

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90 percent by weight of the polymer, contain end groups having one or more frequently both of formulae (II) and (III). In particular, polyphenylene ethers originally containing at least about 60 percent by weight of molecules having aminoalkyl end groups of formula (II) are contemplated for use in the present invention.

According to the present invention, it is possible to use polyphenylene ethers containing substantial amounts of unneutralized amino nitrogen. The amino compounds include, in addition to the aforementioned amino alkyl end groups, traces of amine (particularly secondary amine) in the catalyst used to form the polyphenylene ether. When such polyphenylene ethers are used, they contain unneutralized amino nitrogen in amounts greater than about 800 ppm, and usually in amounts from about 900 to about 1100 ppm.

Although it is not required, it is possible to utilize as component (A) a polyphenylene ether wherein a substantial proportion of any amino compounds are removed or inactivated. Polymers so treated are sometimes referred to hereinafter as "inactivated polyphenylene ethers". They contain unneutralized amino nitrogen, if any, in amounts no greater than about 800 ppm. Various means for inactivation have been developed and any one or more thereof may be used.

One such method is to precompound the polyphenylene ether with at least one non-volatile compound containing a carboxylic acid, acid anhydride or ester group, which is capable of neutralizing the amine compounds. This method is of particular interest in the preparation of compositions of this invention having high resistance to heat distortion. Illustrative acids, anhydrides and esters are citric acid, maleic acid, agaric acid, succinic acid, succinic anhydride, maleic acid, maleic anhydride, diethyl maleate, citraconic acid, citraconic anhydride, itaconic acid, itaconic anhydride, fumaric acid, methyl fumarate and pyromellitic dianhydride. Because of their relatively high reactivity with amino compounds, the free carboxylic acids and their anhydrides, especially fumaric acid and pyromellitic dianhydride, are generally most useful.

Treatment of the polyphenylene ether with the acid or anhydride may be achieved by heating at a temperature within the range of about 230°-390° C., in solution or preferably in the melt. In general, about 0.3-2.0 and preferably about 0.5-1.5 parts (by weight) of acid or anhydride is employed per 100 parts of polyphenylene ether. The treatment may conveniently be carried out in an extruder or similar equipment.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of creating a pressure of about 200 torr or less.

2. Block Polyetheramides

The blended polymer compositions of the present invention contain up to about 95% by weight of at least one block polyetheramide resin, and preferably, at least about 40% by weight. In one embodiment the block polyetheramide resin is present in an amount of from 50% up to about 60% by weight. In another embodiment, the resin has a flex modulus of about 16 to about 370 MPa.

The block polyetheramide materials used as component (B) in the present invention are thermoplastic elastomers synthesized by a polycondensation reaction of a polyether diol and a carboxylic acid-terminated polyamide. The structure comprises a linear and regular chain of:

(i) a hard block comprising a reoccurring moiety of the following formula (VI):

$$-NH-(CH_2)_n-(CO)- \quad (VI)$$

wherein n is a number of about 5-12; and (ii) a soft block comprising a reoccurring moiety of the following formula (VII):

$$-(CH_2)_m-O- \quad (VII)$$

wherein m is a number of about 2-4.

The properties of the block polyetheramides such as flex modulus can be controlled by changing the nature of the hard block (polyamide) and the soft block (polyether), or by changing the mass balance between these two. In one embodiment, the polyether diol block is prepared from a polybutylene oxide or a polypropylene oxide and the carboxylic amide block is prepared from a carboxylic acid-terminated nylon 12 (polylaurolactam) or nylon 6 (polycaprolactam). A class of suitable block polyetheramides is sold by Atochem Inc. under the trade name PEBAX.

3. Polyepoxides

It is frequently found that impact strength and/or resistance to heat distortion are improved if there is also blended into the composition at least one polyepoxide (C), generally in the amount of about 0–3.0% and preferably about 0.25–2.0% by weight based on the total weight of components (A), (B) and any other polymers present in the composition. When the block polyetheramide (B) has a flex modulus greater than about 75 MPa., the composition contains at least about 0.5% by weight based on the total weight of components (A), (B) and any other polymers present of at least one polyepoxide (C).

Illustrative compounds of this type are homopolymers of such compounds as glycidyl acrylate and glycidyl methacrylate, as well as copolymers thereof, preferred comonomers being lower alkyl acrylates, methyl methacrylate, acrylonitrile and styrene. Component (C) may also comprise a poly(O- or N-epoxyalkyl-substituted) cyclic amide, imide or imidate, usually containing one nonepoxy cyclic moiety although compounds with linked or fused moieties are also contemplated. It is most often a compound in which the epoxyalkyl group is bonded directly to the oxygen or nitrogen atom; however, compounds containing intervening structure, such as 2-carboglycidyloxyethyl compounds, may also be used. The presence of more than one epoxy group per molecule is preferred. At least three epoxy groups are highly preferred due to the ease of preparation therefrom of branched polymeric materials.

Illustrative cyclic nuclei which may be employed as component (C) are the triazine, barbiturate, hydantoin, uracil, pyromellitic diimide, piperazinedione and parabanate ring systems. As previously noted, the epoxy-containing functionalities may be present as substituents on oxygen or nitrogen atoms therein, with nitrogen atoms frequently being preferred. The most suitable compounds are triazine derivatives including triglycidyl cyanurate and triglycidyl isocyanurate (TGIC). TGIC is particularly preferred by reason of its availability and particular suitability for the formation of branched polymeric materials. It has the formula:

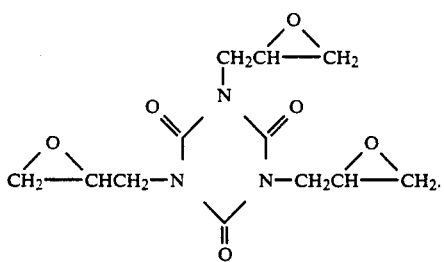

4. Other Components

It is within the scope of the invention to optionally include in the blending step (D), one or more elastomeric impact modifiers compatible with each of the polyphenylene ether (A), the block polyetheramide (B) or the polyepoxide (C). In general, the blended polymer compositions of the present invention will optionally contain from 0 to about 10% by weight of a polyphenylene ether-compatible elastomeric impact modifier (D).

Impact modifiers for polyphenylene ether blends are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, acrylic acid, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include AB and ABA type block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Examples of typical species of AB block copolymers include: polystyrene-polybutadiene (SBR), polystyrene-polyisoprene and poly(alpha-methylstyrene)-polybutadiene.

Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include: polystyrene-polybutadiene-polystyrene (SBS), polystyrene-polyisoprene-polystyrene (SIS), poly(α-methylstyrene)-polybutadiene-poly (α-methylstyrene) and poly(α-methylstyrene)-polyisoprene-poly (α-methylstyrene).

Particularly preferred triblock copolymers are available commercially as CARIFLEX®, KRATON D® AND KRATON G® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from the General Electric Company and sold as GELOY TM resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester and ether-amide elastomers.

It is within the scope of the invention for the composition to optionally contain other conventional ingredients such as fillers, reinforcing materials (e.g., glass fibers), flame retardants, UV stabilizers, pigments, dyes, anti-static agents, mold release agents and the like. Fillers and reinforcing materials, when present, preferably comprise less than 5% by weight of the total composition.

5. Blending Techniques

For the preparation of blended polymer compositions according to this invention, a blending method which results in the formation of an intimate blend is required. Suitable procedures include solution blending and melt blending. Because of the availability of melt blending equipment in commercial polymer processing facilities, melt reaction procedures are generally preferred. Conventional melt blending procedures and equipment may be employed, with extrusion often preferred because of its relative convenience and particular suitability. Typical melt blending temperatures are in the range of about 175°–350° C.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; counterrotating, non-intermeshing twin screw extruders having screws which include forward-flighted compounders, cylindrical bushings and/or left-handed screw elements; corotating, intermeshing twin screw extruders; and extruders having screws which include at least one and preferably at least two sections of kneading block elements. As previously mentioned, vacuum venting may also be achieved at this stage.

EXAMPLES

Various features and aspects of the present invention are illustrated further in the examples that follow. While these examples are presented to show one skilled in the art how to operate within the scope of this invention, the examples are not to serve as a limitation on the scope of the invention since such scope is only defined in the claims.

Unless otherwise indicated in the following examples and elsewhere in the specification and claims, all parts and percentages are by weight, and all temperatures are in degrees centigrade.

In the following examples illustrating the preparation and properties of the blended polymer compositions of this invention, the polyphenylene ethers, block polyetheramides, polyepoxides, and impact modifiers employed are identified as follows:

High nitrogen PPO—a polyphenylene ether homopolymer based on 2,6-dimethyl-1,4-phenylene ether units having an intrinsic viscosity of 0.4 and containing unneutralized amino nitrogen in amounts of 800–1100 ppm.

Vacuum-vented PPO—a polyphenylene ether homopolymer based on 2,6-dimethyl-1,4-phenylene ether units prepared by extrusion with vacuum-venting and having a nitrogen content of about 359 ppm (Kjeldahl method).

TGIC—triglycidyl isocyanurate obtained from Ciba-Geigy as Araldite PT810 and ground to a powder before use.

KRATON G (KG)—a triblock copolymer impact modifier obtained from Shell Chemicals in crumb form.

PEBAX 2533 SA—an extrusion grade block polyetheramide with a flex modulus of 16 MPa. (without additives).

PEBAX 3533 SN—a U.V. stabilized extrusion grade block polyetheramide with a flex modulus of 20 MPa.

PEBAX 3533 SD—a U.V. stabilized extrusion grade block polyetheramide with a flex modulus of 20 MPa. (includes a mold release agent).

PEBAX 4033 SN—a U.V. stabilized extrusion grade block polyetheramide with a flex modulus of 75 MPa.

PEBAX 5533 SA—an extrusion grade block polyetheramide with a flex modulus of 165 MPa. (without additives).

PEBAX 6333 SA—an extrusion grade block polyetheramide with a flex modulus of 370 MPa. (without additives).

Flex modulus values (modulus of elasticity in flexure) according to Atochem were determined using ASTM D 790.

EXAMPLES 1–9

Examples 1–6 were prepared by tumble mixing high nitrogen PPO powder with the other ingredients in a jar mill for one-half hour followed by extrusion on a 20 mm. Welding Engineers twin screw extruder at 400 rpm and barrel segment set temperatures of 121° (throat), 190°, 250°, 250°, 250°, and 250° C. All extrudates were quenched in water, pelletized, and dried in a circulating air oven at 100°–110° C. before molding on a Boy 15-ton molder. Mold barrel set temperatures were between 200° and 220° C, mold temperature was set between 20° and 70° C., and mold cycle times varied between 20 and 35 seconds depending on the modulus of the PEBAX grade in the blend.

The melt blends of Examples 7-9 were prepared similarly to the procedures of Examples 1-6. Blend mechanical properties for Examples 1-9 are shown in Table 1.

TABLE 1

| Ex. | Wt % PPO | Wt % PEBAX | Wt % KG | N.I.[1] | Tensile Stress[2] | Tensile Elongation[3] | Melt Viscosity[4] | Melt Viscosity[5] | Shear Modulus[6] | Shear Modulus[7] | Flexplate Impact[8] |
|---|---|---|---|---|---|---|---|---|---|---|---|
| 1 | 40 | 60 (2533SA) | — | —[a] | 9.0 | 430% | — | — | — | — | — |
| 2 | 36 | 54 (2533SA) | 10 | —[a] | 9.4 | 300% | — | — | — | — | — |
| 3 | 40 | 60 (4033SN) | — | 198 | 15.7 | 145% | — | — | — | — | — |
| 4 | 36 | 54 (4033SN) | 10 | 203 | 17.7 | 192% | — | — | — | — | — |
| 5 | 40 | 60 (6333SA) | — | 21[b] | 16.3 | 16% | — | — | — | — | — |
| 6 | 36 | 54 (6333SA) | 10 | 27[b] | 20.0 | 23% | — | — | — | — | — |
| 7 | 40 | 60 (3533SN) | — | —[a] | 17 | 254% | 871 | 272 | 40 | 12 | 53[c] |
| 8 | 40 | 60 (3533SD) | — | 138 | 9 | 154% | 544 | AC[d] | ~40 | 12 | 39[e] |
| 9 | 40 | 60 (5533SA) | — | 27 | 20 | 41% | 1450 | 372 | 150 | 68 | 32[f] |

[a] too floppy to measure
[b] ultimate brittle failure
[c] ductile
[d] above critical shear rate
[e] brittle/ductile
[f] brittle
[1] Notched Izod impact strength (ASTM D 256) [J/M]; Ex. 1-6 @ 25° C., Ex. 7-9 @ −30° C.
[2] ASTM D 638 [MPa]
[3] increase in distance between two gauge marks at rupture divided by the original distance multiplied by 100
[4] capillary rheometry @ 235° C. 115s$^{-1}$ [Pa.S]
[5] capillary rheometry @ 235° C. 1500s$^{-1}$ [Pa.S]
[6] dynamic mode; 5 rad/sec; 0.3% strain; 25° C. [MPa]
[7] dynamic mode; 5 rad/sec; 0.3% strain; 90° C. [MPa]
[8] impact @ −30° C. [J]

None of the molded test parts in Examples 1-9 showed subjective signs of delamination. The data show that tensile elongation of the test parts decreases with increasing modulus of PEBAX in the blend while tensile strength at break increases with increasing modulus. Notched Izod impact strength shows a similar dependence on PEBAX modulus in that blends with lowest modulus PEBAX 2533 are too floppy to break while blends containing intermediate modulus PEBAX 4033 have good N.I. impact strength and blends with highest modulus PEBAX 6333 have low impact strength and are almost brittle. The presence of KRATON G impact modifier has little or no effect on blend impact strength, but causes a small increase in tensile strength at break.

EXAMPLES 10-15

Melt blends of high nitrogen PPO powder and PEBAX with addition of triglycidyl isocyanurate (TGIC) were prepared similarly to the procedures of Examples 1-9. Blend mechanical properties are shown in Table 2.

TABLE 2

Blends of PPO Powder and PEBAX and TGIC With and Without KRATON G

| Ex. | Wt. % PPO | Wt % PEBAX | Wt % TGIC[1] | KG | N.I.[2] | Tens. Ult. | Elong. |
|---|---|---|---|---|---|---|---|
| 10 | 40 | 60 (2533) | 0.5 | — | —[a] | 10.1 | 438% |
| 11 | 36 | 54 (2533) | 0.5 | 10 | —[a] | 10.6 | 391% |
| 12 | 40 | 60 (4033) | 0.5 | — | 278 | 17.8 | 171% |
| 13 | 36 | 54 (4033) | 0.5 | 10 | 262 | 19.0 | 163% |
| 14 | 40 | 60 (6333) | 0.5 | — | 27 | 22.7 | 46% |
| 15 | 36 | 54 (6333) | 0.5 | 10 | 48 | 26.5 | 69% |

[a] too floppy to break
[1] wt % based upon the total weight of resinous blend constituents
[2] Notched Izod impact strength (ASTM D 256) [J/M]) @ 25° C.

The data show that mechanical properties are improved with TGIC present compared to blends without TGIC in Table 1. The same dependence of tensile and impact properties on PEBAX modulus is observed with TGIC present except that blends containing highest modulus PEBAX 6333 are now ductile instead of borderline brittle. The addition of KRATON G again resulted in increase in tensile strength at break but had little effect on impact strength.

EXAMPLE 16

A blend containing vacuum-vented PPO extrudate (40 parts), PEBAX 4033 (60 parts), and TGIC (0.5 parts) was prepared similarly to the procedures of Examples 1-9. The blend gave molded test parts with a notched Izod of 187 J/M, tensile strength at break of 15.6 MPa., and tensile elongation of 102%.

Although the above examples are limited to only a few of the variables applicable to the compositions and methods within the scope of the present invention, it should be understood that the scope of the present invention can be further appreciated by the description preceding these examples. Therefore, it is to be understood that the invention disclosed herein is intended to cover such modifications as fall within the scope of the appended claims.

What is claimed is:

1. A blended polymer composition consisting essentially of:
   (A) at least about 5% by weight of at least one polyphenylene ether having a nitrogen content greater than about 800 ppm;
   (B) at least one block polyetheramide present in an amount up to about 95% by weight; and
   (C) from about 0.25% up to about 3% by weight based upon the total weight of components (A), (B) and any other polymers present in the composition of at least one polyepoxide; with the proviso that when said block polyetheramide has a flex modulus greater than about 75 MPa., said composition contains at least about 0.5% by weight based on the total weight of components (A), (B) and any other polymers present in the composition of said polyepoxide.

2. A blended polymer composition according to claim 1 wherein said polyphenylene ether (A) comprises a plurality of structural units having the following formula (I):

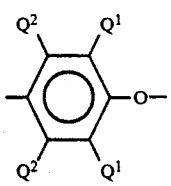 (I)

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and $Q^2$ is independently hydrogen, halogen, primary or secondary lower alkyl, phenyl, haloalkyl, hydrocarbonoxy or halohydrocarbonoxy as defined for $Q^1$.

3. A blended polymer composition according to claim 2 wherein said polyphenylene ether is a poly(2,6-dimethyl-1,4-phenylene ether).

4. A blended polymer composition according to claim 1 wherein said block polyetheramide (B) comprises:
(i) a hard block of the following formula (VI):

$$-NH-(CH_2)_n-(CO)- \quad (VI)$$

wherein n is a number of about 5-12; and
(ii) a soft block of the following formula (VII):

$$-(CH_2)_m-O- \quad (VII)$$

wherein m is a number of about 2-4.

5. A blended polymer composition according to claim 4 wherein said block polyetheramide comprises a soft block prepared from a polybutylene oxide or a polypropylene oxide and a hard block prepared from a carboxylic acid-terminated nylon 12 or nylon 6.

6. A blended polymer composition according to claim 1 wherein said polyepoxide (C) comprises an epoxy functionalized triazine, barbiturate, hydantoin, uracil, pyromellitic diimide, piperazinedione or parabanate ring system.

7. A blended polymer composition according to claim 6 wherein said polyepoxide (C) comprises triglycidyl isocyanurate.

8. A blended polymer composition resultant from melt blending a mixture consisting essentially of:
(A) at least about 30% by weight of at least one polyphenylene ether having a nitrogen content greater than about 800 ppm, and comprising a plurality of structural units having the following formula (I):

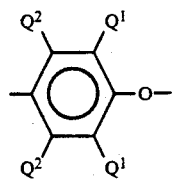 (I)

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and $Q^2$ is independently hydrogen, halogen, primary or secondary lower alkyl, phenyl, haloalkyl, hydrocarbonoxy or halohydrocarbonoxy as defined for $Q^1$;

(B) from 50% up to about 60% by weight of at least one block polyetheramide comprising:
(i) a hard block comprising a reoccurring moiety of the following formula (VI):

$$-NH-(CH_2)_n-(CO)- \quad (VI)$$

wherein n is a number of about 5-12; and
(ii) a soft block comprising a reoccurring moiety of the following formula (VII):

$$-(CH_2)_m-O- \quad (VII)$$

wherein m is a number of about 2-4; and
(C) from about 0.25% up to about 3% by weight based on the total weight of components (A), (B) and any other polymers present in the composition of at least one polyepoxide; with the proviso that when said block polyetheramide has a flex modulus of greater than about 75 MPa., said mixture contains at least about 0.5% by weight based on the total weight of components (A), (B) and any other polymers present in the composition of said polyepoxide.

9. A blended polymer composition consisting essentially of:
(A) at least about 5% by weight of at least one polyphenylene ether having a nitrogen content greater than about 800 ppm.;
(B) at least one block polyetheramide present in an amount up to about 95% by weight;
(C) from about 0.25% up to about 3% by weight based upon the total weight of components (A), (B) and any other polymers present in the composition of at least one polyepoxide; with the proviso that when said block polyetheramide has a flex modulus greater than about 75 MPa., said composition contains at least about 0.5% by weight based on the total weight of components (A), (B) and any other polymers present in the composition of said polyepoxide; and
(D) an amount up to about 10% by weight of at least one elastomeric polyphenylene ether-compatible impact modifier.

10. A blended polymer composition according to claim 9 wherein component (D) is a triblock polymer wherein the end blocks are derived from styrene and the midblock is derived from at least one of isoprene and butadiene.

11. A blended polymer composition according to claim 10 wherein the aliphatic unsaturation in said midblock has been removed by selective hydrogenation.

12. A blended polymer composition resultant from melt blending a mixture consisting essentially of:
(A) a least about 30% by weight of at least one polyphenylene ether having a nitrogen content greater than about 800 ppm. and comprising a plurality of structural units having the following formula (I):

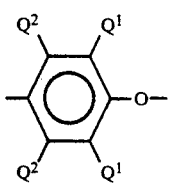 (I)

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and $Q^2$ is independently hydrogen, halogen, primary or secondary lower alkyl, phenyl, haloalkyl, hydrocarbonoxy or halohydrocarbonoxy as defined for $Q^1$;

(B) from 50% up to about 60% by weight of at least one block polyetheramide comprising:
  (i) a hard block comprising a reoccurring moiety of the following formula (VI):

$$-NH-(CH_2)_n-(CO)- \qquad (VI)$$

wherein n is a number of about 5–12; and
  (ii) a soft block comprising a reoccurring moiety of the following formula (VII):

$$-(CH_2)_m-O- \qquad (VII)$$

wherein m is a number of about 2–4; and (C) from about 0.25% up to about 3% by weight based on the total weight of components (A), (B) and any other polymers present in the composition of at least one polyepoxide; with the proviso that when said block polyetheramide has a flex modulus of greater than about 75 MPa., said mixture contains at least about 0.5% by weight based on the total weight of components (A), (B) and any other polymers present in the composition of said polyepoxide; and (D) an amount up to about 10% by weight of at least one elastomeric polyphenylene ether-compatible impact modifier.

* * * * *